Dec. 29, 1970   G. A. REMUS ET AL   3,550,355
OXYGEN SEPARATION PROCESS
Filed Dec. 22, 1967
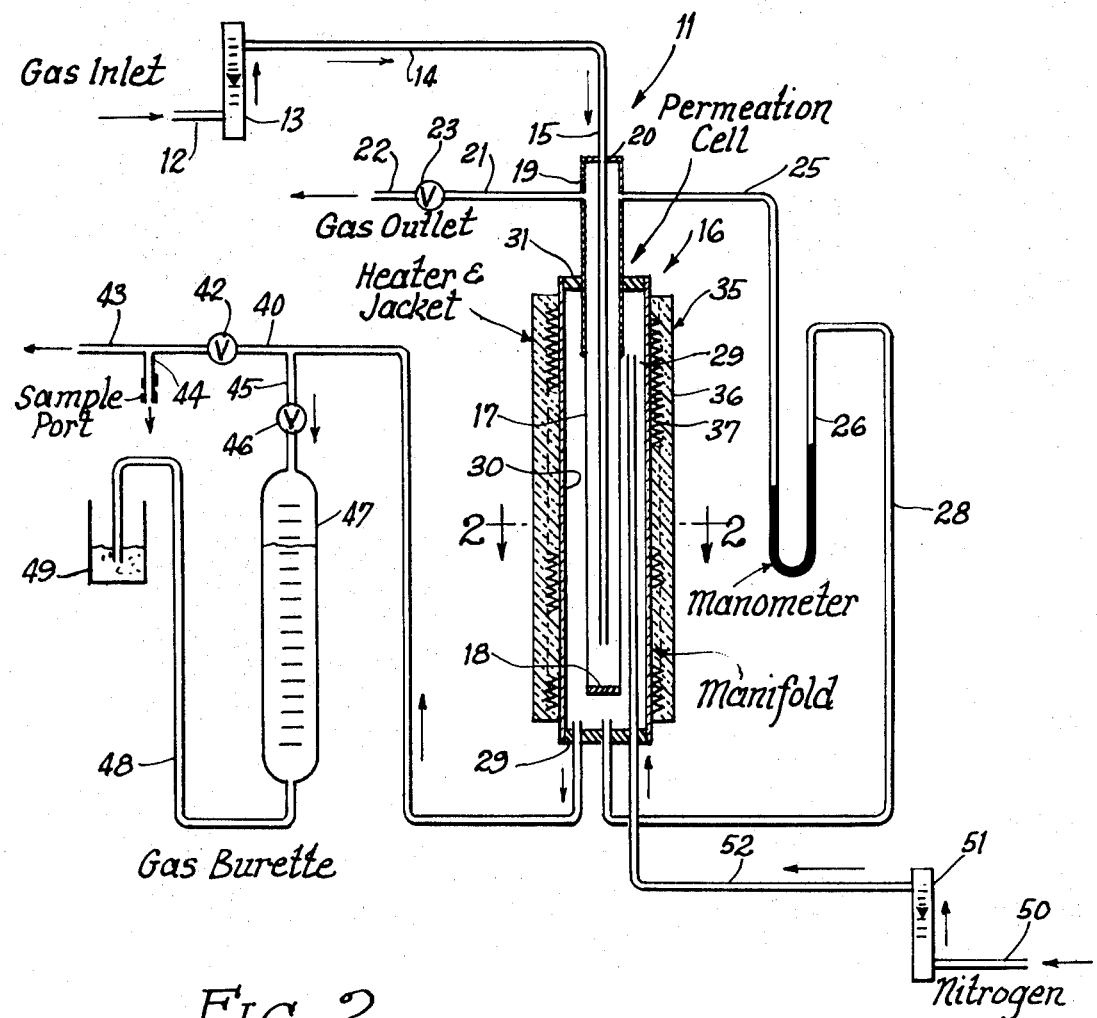
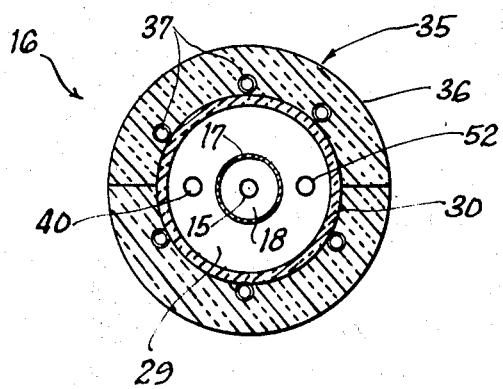
INVENTORS
George A. Remus
Albert J. Glueckert
by Claron N. White
Attorney

United States Patent Office 3,550,355
Patented Dec. 29, 1970

3,550,355
OXYGEN SEPARATION PROCESS
George A. Remus, Chicago, and Albert J. Glueckert, Skokie, Ill., assignors to General American Transportation Corporation, a corporation of New York
Filed Dec. 22, 1967, Ser. No. 692,904
Int. Cl. B01d 53/22
U.S. Cl. 55—16                                               9 Claims

ABSTRACT OF THE DISCLOSURE

An article having a metal layer with a composition consisting essentially of silver and a minor percentage of at least one other metal is used in a process to separate oxygen gas from a gaseous mixture at an elevated temperature. This article has a longer life for use in the separation than does relatively pure silver.

---

The invention described herein was made in the performance of work under a NASA contract and is subject to the provisions of section 305 of the National Aeronautics and Space Act of 1958, Public Law 85–568 (72 Stat. 435; 42 U.S.C. 2457).

BACKGROUND OF THE INVENTION

(1) Field of the invention

This invention relates to a process of separting oxygen from a gaseous mixture containing oxygen gas.

(2) Description of the prior art

It is known that pure silver is selectively permeable for oxygen gas and that a thin layer or membrane of pure silver can be used to separate two zones or chambers so that oxygen will transfer through the silver wall while other gases are not transferred. This process utilizes an elevated temperature to increase the rate of permeation or transfer of oxygen. At such elevated temperature silver changes. As a result, the wall of silver becomes porous so that thereafter other gases will pass through the wall and the selectivity is lost.

It is known that articles of silver at elevated temperatures in air will have a substantial crystal growth of the silver metal. This is undesirable for various products utilizing its high electrical or thermal conductivity.

In studies by another on the dependence of the permeability of silver to oxygen at various temperatures it was found that the life of the pure silver is limited. The silver barrier or wall failed in 10 minutes at 900° C. It was discovered that the failed barrier had become porous and appeared to show what looked like crystal growth. That work is reported in an article by R. E. Coles entitled, "The Permeability of Silver to Oxygen," Brit. J. Appl. Phys., 1963, vol. 14, pp. 342–344.

It is known by those in the field of high-temperature electric switches that the life of silver contacts in the switch can be improved by incorporating a small amount of a metal or material to inhibit grain growth of the silver. Such incorporated materials include magnesium and cadmium (illustratively, U.S. 2,669,512). Manufacturers of silver alloys that are specifically intended for use in electric switches have indicated that incorporation of palladium also inhibits grain growth.

There has been an incorporation of a small amount of such metals as magnesium and cadmium to provide improved springs of silver having high electrical and thermal conductivity (illustratively, U.S. 3,117,894). The alloy is rolled to a strip, treated with oxygen for internal oxidation and then cold rolled to the final shape desired. The alloying materials merely provide a hardening of the silver by the oxygen treatment as an intermediate stage of mechanical working.

The improvement in the life of the silver membrane used in an oxygen separation process is not necessarily obtained by the incorporation of a material that inhibits grain growth. This was learned during the research leading to the present invention. For example, the incorporation of a small amount of palladium inhibits grain growth in the resultant silver alloy as a membrane, but the latter does not have the permeability characteristics required to separate oxygen from a gaseous mixture.

SUMMARY OF THE INVENTION

This invention relates to a silver-base composition that is in the form of an article in one aspect of the invention and is used as that article in a process for separating oxygen gas from a gaseous mixture containing oxygen gas in another aspect of this invention.

Although it was first found by use that silver alloyed with a small amount of palladium does not solve the problem of the degradation of silver used in an oxygen separation process, we have found that a very substantial improvement in the useful life of silver for that separation process can be obtained by a specific type of metal that has been incorporated in silver heretofore for the purposes mentioned above that bear no relationship in an oxygen separation process. The studies described below show that this incorporation inhibits the rate of grain growth of silver, but it does this without adversely affecting the selective oxygen permeability of the metal composition. There are indications that oxygen permeability is enhanced by the use of the article of this invention when it is used in the process of the invention.

The article of the invention includes a metal layer having a composition consisting essentially of silver and a minor percentage of at least one metal convertible to its oxide at a temperature that corresponds to the temperature used, as described below, for the process of the present invention.

The process of this invention in an improvement, at least as regards the period of time for which the process can be carried out without replacing a layer through which oxygen gas is selectively transferred to separate it from another gas or other gases, as compared with the process using relatively pure silver as the composition of the metal layer. This process includes the steps of (1) introducing said gaseous mixture to a zone separated from another zone by a layer of oxygen-permeable metal, (2) causing said oxygen of the gaseous mixture to selectively permeate said layer and pass into said another zone, and (3) removing oxygen gas from said another zone. The elevated temperature is sufficiently high. The improvement for the process comprises using as the oxygen-permeable metal for said layer a composition consisting essentially of silver and a minor percentage of at least one metal convertible to its oxide at the temperature of the layer during the selective permeation. The metal in said composition with silver is present in an amount sufficient to inhibit grain growth of the silver to the extent that the life of the layer, before loss of selective transfer, i.e., before the occurrence of porosity, is more than double that of pure silver as a layer of the same thickness and used in the process under the same conditions. Pure silver contains at least 99.99% Ag.

The metal composition on a weight basis contains the metals convertible to their oxides in amount that the total is, for example, between about 0.1% and about 10% of the composition but it is preferred that this total be between about 0.1% and about 5%. It is especially preferred that this total is a maximum of about 0.8%. There are numerous metals that meet the requirement that they be convertible to their oxide at that elevated temperature. Preferred metals are magnesium and nickel. It is further preferred that these be used together with copper on a total weight basis of between about 0.1% and about 5%, while it is especially preferred that this total be between about 0.2% and about 0.8%. The same preferred values are present for the total of magnesium and other metals as a combination incorporated in the silver.

In the foregoing reference to the metal that is incorporated with silver in the composition used for the article in the process of the invention, there is reference to the convertibility of the metal to its oxide at the temperature used for the separation process. This limitation refers to the convertibility of that metal by itself and does not require that it be thus convertible in the environment of the major component of the composition; namely, silver. Furthermore, and obviously, the metal when converted to its oxide in such composition is not required to be converted during the carrying out of the separation process. Actually it can be converted previously by contact with a gas containing oxygen gas under conditions that there would be no separation of oxygen from other gases. This would be the case if the layer being treated is immersed in such a gas and held while immersed at the elevated temperature used for the separation process. Thereafter, this treated layer could be used. However, such pretreatment is not necessary to carry out the process because such conversion can occur at the initial stage of the carrying out of the separation process.

BRIEF DESCRIPTION OF THE DRAWING

FIG. 1 is a combination flow sheet and schematic view of apparatus, partly in section, used to evaluate the effectiveness of the process of the invention.

FIG. 2 is a cross section of the apparatus taken along the line 2—2 of FIG. 1.

DETAILED DESCRIPTION

Referring to FIG. 1, a separation assembly generally is indicated at 11. A gaseous mixture is fed by a pipe 12 through a flowmeter 13 and a pipe 14 having a downwardly extending portion 15 that extends into a separation sub-assembly or permeation cell generally indicated at 16. The assembly 16 constitutes a metal tube 17 open at both ends but with a plug 18 of the metal brazed on the bottom end. A stainless steel tube 19 is brazed to the other end of tube 17. The portion 15 of tube 14 extends through a closed end 20 of tube 19. From the top portion of tube 19 extends a pipe 21 that is connected to a pipe 22 by a valve 23 to provide an outlet for the gas introduced to the separation subassembly 16 by tube 12, etc. A pipe 25 is also connected to tube 19 near its top. The pipe 25 is connected to one leg of a U-tube 26. The other leg of U-tube 26 is connected by a pipe 28 that has its other end extending through a plug 29 mounted in the bottom of a Vycor (a silica product of Corning Glass Works) tube 30 of assembly 11. The tube 30 is closed at its top by a plug 31 through which extends subassembly 16. The tube 30 is surrounded by two halves of a cylindrical tubular heating unit 35 that comprises a heat-insulating material 36 and electrical wires 37 connected to a source (not shown).

An outlet pipe 40 extends up into Vycor tube 30 through plug 29 and its other end is connected by a valve 42 to a pipe 43 that has a sample side pipe 44. The pipe 40 is also connected by a pipe 45 valve 46 to a gas burette 47. The other end of burette 47 is connected by a pipe 48 to a container 49 that can receive liquid transferred from burette 47 to container 49 by displacing gas.

From the foregoing description, it is seen that the separation subassembly 16 comprises a tube 14 by which a gaseous mixture is introduced into bottom portion of the interior of tube 17. The introduced gas rises in tubes 17 and 19 and passes out through pipe 21, valve 23 and pipe 22. Thus, there is a constant flow of gaseous mixture containing oxygen gas along the inside surface of the wall of metal tube 17. Oxygen gas permeates through that wall into the annular chamber defined by tube 17 and outer Vycor tube 30. To avoid a buildup of partial oxygen pressure in the annular chamber that would eventually approximate that in tube 17 and thus preclude further oxygen transfer and to permit a determination of the rate of permeation, nitrogen gas is introduced by pipe 50 through flow-meter 51 and through pipe 52 that has an open end in the top portion of the annular chamber in tube 30, as mentioned above. This nitrogen flows out of the annular chamber and carries along with it oxygen that has transferred through the wall of tube 17. This nitrogen can be exited out pipe 43 with valve 42 open and valve 46 closed. With this arrangement, samples can be obtained from pipe 44, as desired.

In some tests, nitrogen was not used to remove oxygen from the annular chamber mentioned above. Under these conditions valve 46 was open and valve 42 was closed with the exit gas being collected in gas burette 47. The increase in gas volume, due to oxygen permeation through the wall of tube 17 was determined by the volume of liquid displaced from burette 47 to container 49.

A membrane of pure silver in the form of tube 17 was made. It was 5.5 inches long and had an outside diameter of 0.4 inch with a wall thickness of about 0.004 inch. This tube 17 was silver brazed to tube 19 and a pure silver plug 18 was brazed to the other end of tube 17. This assembly was tested at room temperature with an internal pressure of 15 p.s.i.g. and found to be free of leaks. This assembly was slowly heated from room temperature to 1300° F. over a period of three days while nitrogen gas was introduced to the inside of tube 17 to provide an internal pressure of 2 inches of water. There was no leakage of nitrogen from the inside of tube 17 maintained in this condition overnight, but when the nitrogen pressure was increased to 1 p.s.i.g. a large volume of gas escaped from tube 17.

An examination of tube 17 treated as mentioned above, indicated there were microscopic pin holes and the surface of the silver tube 17 had a crystalline grainlike appearance.

U.S. Pat. No. 3,155,467 states that palladium as a wall, is selectively permeable to hydrogen gas, but at below 200° C. it is converted into a different phase of palladium and thereby becomes of no further use. That patent also mentions that an earlier patent claimed an improvement by the use of silver as an alloy of palladium in which the percentage of silver is less than 50% of the alloy. U.S. 3,155,467 provides a further improved process. A third metal is incorporated in the alloy. In view of these results with palladium in a process for selective permeability and the known suitability of a small amount of palladium in silver to inhibit grain growth, as mentioned above, a tube 17 was made of a silver alloy containing 3% palladium and the balance pure silver. This tube was fabricated after a sample of that alloy was subjected to various combinations of gaseous atmospheres, temperatures, hold times at such temperatures, and cooling rates in order to compare the grain growth of that alloy to that of pure silver. Those studies indicated that the silver and palladium alloy mentioned above did not form the large grains as did pure silver under such conditions.

The tube 17 made of the silver alloy, containing 3% palladium and 97% silver, had the dimensions of the pure silver tube mentioned above except that it was 12 inches long instead of 5.5 inches long and it had a wall thickness of 0.005 inch. This tube was brazed to a plug 18 of pure silver and a stainless steel tube 19. This assembly 16 was used in the separation assembly 11, shown in FIG. 1 and described earlier. The feed gas was oxygen having an indicated oxygen content of 99.8%. The temperaure in assembly 16 was between 900° F. and 1300° F. during the period of operation for three weeks. At the end of that time a leak developed at one end of the silver solder joint. During this period of time, in which the temperature was varied over the range indicated above, nitrogen gas was introduced by pipe 50 and the gas flowing out of assembly 16 by pipe 22 was sampled chromatographically, as described below, to determine whether any oxygen had permeated the wall of tube 17 to mix then with the nitrogen gas. No oxygen was detected in the nitrogen effluent gas. The results indicate that merely inhibiting grain growth of silver is not the answer to the improvement of the use of silver for selective permeation of oxygen. As a matter of fact, the results indicate that the alloying with palladium can result in this case in an inhibition of oxygen permeation.

A study, similar to that of the Ag-Pd alloy, was made of the suitability of an alloy containing on a weight basis about 0.2% magnesium, about 0.2% nickel, and about 0.2% copper alloyed with pure silver so that silver constitutes essentially the balance of the composition of the alloy. An analysis of this alloy for magnesium, nickel and copper content was made. The results reported on a weight basis were 0.22% magnesium, 0.15% nickel, and 0.23% copper. This alloy did not have the large grain growth that high purity silver exhibits. Pure silver plugs 18 and stainless steel tubes 19 were brazed to tubes 17 of this alloy that were 12 inches long, outside diameter of 0.5 inch and a wall thickness of 0.0085 inch.

The subassembly 16 with tube 17 of the silver alloy, containing magnesium, copper and nickel as described above, was operated without failure for two months under the conditions described above for the use of tube 17 made of the silver alloy containing 3% palladium. During this test, the rate of oxygen permeation was determined and the rate was greater than the values reported in the published literature for pure silver.

Also during this test run, tests for leaks were performed periodically to confirm that the flow of oxygen was by permeation rather than by leakage. This test for leakage was made by flushing both sides of tube 17 with nitrogen gas, applying a pressure differential between the nitrogen gas in tube 17 and the nitrogen gas in the annular chamber between tubes 17 and 30, and observing whether there was a decrease in pressure on the high pressure side of the wall of tube 17.

In the operation of the separation assembly 11 using tube 17 of the silver alloy containing magnesium, copper and nickel two feed gas compositions were introduced through pipe 12. One was oxygen 99.8% pure and the other was a mixture containing 33.2% oxygen and 66.8% carbon dioxide. The temperature was varied from 1300° F. to 1400° F., the latter temperature being the high limit of operation for the assembly because of the melting point of the silver brazing alloy used in the construction of the permeation cell 16.

Using 99.8% pure oxygen and a temperature of 1300° F. to 1310° F. the permeation rate was in the range of 20.4 to 29.4 cc. per hour. These compared with the calculated rates of 16.9 and 16.1 cc. per hour from the literature using pure silver. Using this oxygen at a temperature of 1350° F. to 1370° F. for the temperature of operation, the permeation rate varied between 29.4 and 45 cc. per hour as compared with calculated values of 22.8 and 24.4 cc. per hour for pure silver calculated from the published literature.

Using the mixture of oxygen and carbon dioxide mentioned above and temperature ranges of 1300° F. to 1310° F., 1350° F. to 1360° F., and 1380° F. to 1390° F., the permeation rates in cc. per hour were 10.2 to 13.8, 24.6 to 28 and 30.1, respectively. For pure silver the calculated permeation rates based on results reported in the literature were 9.7 and 9.2 for the low range of temperature, 14 and 13.1 for the intermediate temperature range and 16.5 and 15.5 for the high temperature range.

The following is a typical run using tube 17 of this silver alloy containing magnesium and nickel. The ambient pressure uncorrected was 751.7 mm. of mercury at 22.3° C. Gas introduced by tube 12 was the mixture of oxygen and carbon dioxide. It was introduced at the flow rate of 16 cc. per minute. Nitrogen gas that had an indicated purity of at least 99.9% was introduced by pipe 50 at a flow rate of 7 cc. per minute. The pressure differential across the tube 17 was 0.1 inch of mercury with the interior of tube 17 having the higher pressure.

A sample is taken of gas exiting by pipe 40, open valve 42 and pipe 43 and analyzed for oxygen content. The analysis was made by injecting 0.7 cc. of this sample from a conventional gas syringe into a gas chromatograph, specifically Aerograph A-90-P. The detector is thermal conductivity cell with a detector current of 200 ma. using helium as the carrier gas at a flow rate of 12 cc. per minute. The columns contained silica gel through the detector and molecular sieves 5A through the other side of the detector. The purpose of using two columns is based on the fact that silica gel separates carbon dioxide from air and molecular sieves separate oxygen and nitrogen. The temperatures of the injector, columns, and detector were 81° C., 84° C. and 148° C., respectively.

The chromatograph had as an accessory an integrator. The sample injected gave a result of 820 integrator units for the peak area representing oxygen gas. The injection of a sample of gas that had, as its stated analysis by the supplier, 10.2% oxygen, 39% nitrogen and balance carbon dioxide showed an oxygen peak of 775 integration units. Thus, the volume percentage of the sample from pipe 43 of nitrogen gas containing oxygen was 10.2 times 820 divided by 775, i.e., 10.8%. This gaseous mixture contained nitrogen as the difference, namely, 89.2%, because the chromatograph analysis did not indicate any carbon dioxide. Based on a flow rate of nitrogen of 5.5 cc. per minute and the nitrogen content for the mixture mentioned above, it was calculated that the flow rate of permeated oxygen was 0.67 cc. per minute.

The foregoing description illustrates the invention in the separation of oxygen from carbon dioxide. Such gaseous mixture is obtained in an overall process that obtains oxygen from carbon dioxide by converting carbon dioxide into carbon and oxygen for use of the system on a manned spacecraft. In that process a mixture of oxygen and carbon dioxide is evolved from the anode of an electrolysis cell. A representative mixture would contain 0.073 lb. of oxygen per 0.2 lb. of carbon dioxide. The electrolysis cell is fed the carbon dioxide that is free of or of lower content, additional carbon dioxide, and a mixture of carbon dioxide and carobn monoxide. The latter is recycled from a catalytic reactor from which the other product is carbon. The feed to that reactor is a mixture of carbon dioxide and carbon monoxide obtained from the cathode of the electrolysis cell.

In another example of the invention, oxygen was separated from nitrogen using compressed air as the gaseous mixture fed by pipe 12. The flushing gas that was introduced by pipe 50 was carbon dioxide instead of nitrogen. The carbon dioxide contained a trace of nitrogen but analysis of gas from pipe 40 indicated that the nitrogen content in the carbon dioxide gas had not increased by its passage through the permeation cell. The experiment was run first as 1250° F. and later increased to a run at 1370° F. for increased rate of oxygen permeation. The results indicate that oxygen satisfactorily permeated tube 17 to separate oxygen from nitrogen. During the run of more than two days there was no loss of this selective permeability of the silver alloy.

Of course, other gaseous mixtures may be utilized in the present invention and such gases would be those not permeable to pure silver and not corrosive. The reason for the latter limitation should be obvious.

The foregoing description has been presented solely for the purpose of illustration and not by way of a limitation of the invention. Many modifications will be obvious to one of ordinary skill in this art in view of the description. The invention is limited solely by the claims that follow:

We claim:
1. In the process of separating oxygen gas from a gaseous mixture containing oxygen gas by the steps that include:
   (1) introducing said gaseous mixture to a zone separated from another zone by a layer of oxygen-permeable metal,
   (2) causing said oxygen of the gaseous mixture at an elevated temperature to selectively transfer through said layer and pass into said another zone, and
   (3) removing oxygen gas from said another zone, said elevated temperature being sufficiently high to cause in a relatively short period of time a loss of selective transfer of oxygen gas through a layer of relatively pure silver, the improvement that comprises using as the metal for said layer a composition consisting essentially of silver and a minor percentage of at least one metal convertible to its oxide at the temperature of the layer during the selective transfer, said metal in said composition with silver being present in an amount sufficient to inhibit the rate of grain growth of the silver and to retain the selective transfer for the layer for a period of time that is at least double that of a layer of relatively pure silver of the same thickness and used in the process under the same conditions and said composition, on a weight basis of said composition, containing at least about 0.1% magnesium as part at least of said metals convertible to their oxides.

2. The process of claim 1 wherein on a weight basis the total of said metals convertible to their oxides is between about 0.1% and about 5% of said composition.

3. The process of claim 2 wherein the upper limit of said total is about 0.5%.

4. The process of claim 1 wherein said total is between about 0.2% and about 0.8%.

5. The process of claim 4 wherein said metals convertible to their oxides includes nickel.

6. The process of claim 5 wherein said convertible metals consists of magnesium, nickel, and copper.

7. The process of claim 6 wherein said composition contains about 0.2% magnesium, about 0.2% nickel, and about 0.2% copper and wherein the gaseous mixture consists essentially of oxygen and carbon dioxide.

8. The process of claim 6 wherein said composition contains about 0.2% magnesium, about 0.2% nickel and about 0.2% copper and wherein the gaseous mixture consists essentially of oxygen and nitrogen.

9. The process of claim 8 wherein said gaseous mixture is air.

References Cited
UNITED STATES PATENTS

| | | | |
|---|---|---|---|
| 2,187,379 | 1/1940 | Hensel et al. | 75—173 |
| 2,197,393 | 4/1940 | Hensel et al. | 75—173X |
| 2,773,561 | 12/1956 | Hunter | 75—173X |
| 3,155,467 | 11/1964 | Yamamoto | 55—16 |
| 3,172,742 | 3/1965 | Rubin | 55—16 |
| 3,359,705 | 12/1967 | Mullhaupt | 55—16 |
| 3,367,604 | 2/1968 | Matteo | 75—173X |

L. DEWAYNE RUTLEDGE, Primary Examiner

E. L. WEISE, Assistant Examiner

U.S. Cl. X.R.

29—180, 183; 75—173